US012748612B2

United States Patent

Lunev et al.

(12) United States Patent
(10) Patent No.: US 12,748,612 B2
(45) Date of Patent: Sep. 29, 2026

(54) VM DISK CONVERSION (RESISTIBLE TO POWER OFF)

(71) Applicant: Virtuozzo International GmbH, Schaffhausen (CH)

(72) Inventors: Denis Lunev, Belgrade (RS); Kirill Tkhai, Moscow (RU)

( * ) Notice: Subject to any disclaimer, the term of this patent is extended or adjusted under 35 U.S.C. 154(b) by 637 days.

(21) Appl. No.: 18/091,297

(22) Filed: Dec. 29, 2022

(65) Prior Publication Data

US 2024/0220299 A1 Jul. 4, 2024

(51) Int. Cl.
*G06F 9/455* (2018.01)

(52) U.S. Cl.
CPC .................... *G06F 9/45558* (2013.01); *G06F 2009/45583* (2013.01)

(58) Field of Classification Search
None
See application file for complete search history.

(56) References Cited

U.S. PATENT DOCUMENTS

2015/0058382 A1* 2/2015 St. Laurent ........... G06F 16/116 707/823
2016/0041993 A1* 2/2016 Maynard ............... G06F 16/116 707/809
2017/0090903 A1* 3/2017 Bainville .................. G06F 8/71
2018/0165301 A1* 6/2018 Luo ....................... G06F 3/0665
2023/0305723 A1* 9/2023 Hiregoudar ........... G06F 3/0634

* cited by examiner

*Primary Examiner* — Wynuel S Aquino

(57) ABSTRACT

Techniques for conversion of a virtual disk image are described. The described techniques enable a virtual disk image to be converted from a first version to a second version, such as to enable a virtual machine to be used by different host systems. Accordingly, the described techniques can convert a virtual disk image by creating a new header and new metadata for the virtual disk image in a new format. The new header includes pointers to the new metadata and the new metadata includes pointers to data of the virtual disk image. A previous header for the virtual disk image is removed to cause virtual disk image to be converted to a new version.

21 Claims, 10 Drawing Sheets

VM DISK CONVERSION (RESISTIBLE TO POWER OFF)

BACKGROUND

Virtual machines are utilized for a variety of computing purposes, such as to provide execution environments that are isolated from other portions of a host computing system. Occasionally, a virtual disk image of a virtual machine is converted from one format to another, such as to enable the virtual machine to be utilized by a different virtual machine host.

To enable a virtual disk image to be converted from a first format to a second format, conventional implementations typically read content of the virtual disk image from a file in the first format and write content of the virtual disk image to a different file in the second format. Thus, after creating the virtual disk image in the second format, two instances of the virtual disk image may exist. Accordingly, conventional systems can be burdensome on system resources by utilizing Input/Output operations needed to copy an entire content of the virtual disk image from the file in the first format to the file in the second format, as well as utilizing storage space needed to store two versions of the virtual disk image.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for conversion of a virtual disk image are described. The described techniques enable a virtual disk image to be converted from a first version to a second version, such as to enable a virtual machine to be used by different host systems. According to aspects, a "version" of a virtual disk image refers to a file format and/or a file format version of the virtual disk image. Accordingly, the described techniques can convert a virtual disk image by creating a new header and new metadata for the virtual disk image in a new format. The new header includes pointers to the new metadata and the new metadata includes pointers to data of the virtual disk image. A previous header for the virtual disk image is removed to cause virtual disk image to be converted to a new version.

In some aspects, the techniques described herein relate to a method including: determining that a first version of a file that includes a virtual machine disk image is to be converted from the first version to a second version, wherein the first version of the file includes a first header, a first metadata set, and a first data set; and generating the second version of the file, including: generating, within the file, a second header and a second metadata set; writing the file with the second header and the second metadata set to disk; and switching an active header for the file from the first header to the second header.

In some aspects, the techniques described herein relate to a method, wherein second version of the file includes one of a different file format than the first version of the file, or a modification of a format attribute of a file format of the first version.

In some aspects, the techniques described herein relate to a method, wherein generating the second header within the file includes generating the second header within a first unused space within the file.

In some aspects, the techniques described herein relate to a method, further including generating the first unused space within the file by moving a first metadata of the first metadata set to a second unused space within the file.

In some aspects, the techniques described herein relate to a method, wherein the first unused space is adjacent the first header.

In some aspects, the techniques described herein relate to a method, wherein generating the first unused space with the file further includes moving a data portion of the first data set to a third unused space within the file.

In some aspects, the techniques described herein relate to a method, further including configuring a pointer in the first metadata to identify a location of the moved data portion of the first data set.

In some aspects, the techniques described herein relate to a method, wherein generating the second version of the file includes maintaining one or more of the first version of the file or the second version of the file in a consistent state during generation of the second version of the file.

In some aspects, the techniques described herein relate to a method, further including configuring one or more pointers of the second metadata set to identify a location of the first data set within the file, and wherein the one or more pointers identify the location of the first data set relative to a start of the second header.

In some aspects, the techniques described herein relate to a method, further including cutting the first header to cause the second header to be a new start of the file.

In some aspects, the techniques described herein relate to a format conversion system including: one or more processors; and one or more storage devices including processor executable instructions that, responsive to execution by the one or more processors, cause the system to perform operations including: determining that a first version of a file that includes a virtual machine disk image is to be converted from the first version to a second version, wherein the first version of the file includes a first header, a first metadata set, and a first data set; and generating the second version of the file, including: generating, within the file, a second header and a second metadata set; writing the file with the second header and the second metadata set to disk; and switching an active header for the file from the first header to the second header.

In some aspects, the techniques described herein relate to a format conversion system, wherein the operations further include: generating a first unused space within the file by moving a first metadata of the first metadata set to a second unused space within the file; and generating the second header within the file within the first unused space within the file.

In some aspects, the techniques described herein relate to a format conversion system, wherein generating the first unused space within the file further includes moving a data portion of the first data set to a third unused space within the file.

In some aspects, the techniques described herein relate to a format conversion system, wherein generating the second version of the file includes maintaining one or more of the first version of the file or the second version of the file in a consistent state during generation of the second version of the file.

In some aspects, the techniques described herein relate to a format conversion system, further including configuring one or more pointers of the second metadata set to identify a location of the first data set within the file, and wherein the one or more pointers identify the location of the first data set relative to a start of the second header.

In some aspects, the techniques described herein relate to a format conversion system, further including cutting the first header to cause the second header to be a new start of the file.

In some aspects, the techniques described herein relate to a format conversion system, wherein generating the second version of the file includes maintaining a position of at least some data of the first data set within the file in the first version of the file such that the at least some data of the first data set has a same position within the second version of the file.

In some aspects, the techniques described herein relate to a virtual machine environment that implements a disk conversion system including: a virtual disk conversion module configured to: determine that a first version of a file that includes a virtual machine disk image is to be converted from the first version to a second version, wherein the first version of the file includes a first header, a first metadata set, and a first data set; and generate the second version of the file, including to: generate, within the file, a second header and a second metadata set; write the file with the second header and the second metadata set to disk; and switch an active header for the file from the first header to the second header.

In some aspects, the techniques described herein relate to a disk conversion system, wherein the virtual disk conversion module is further configured to: generate a first unused space within the file by moving a first metadata of the first metadata set to a second unused space within the file; and generate the second header within the file within the first unused space within the file.

In some aspects, the techniques described herein relate to a disk conversion system, wherein the virtual disk conversion module is further configured to maintain one or more of the first version of the file or the second version of the file in a consistent state during generation of the second version of the file.

BRIEF DESCRIPTION OF THE DRAWINGS

The detailed description is described with reference to the accompanying figures.

DETAILED DESCRIPTION

Overview

To overcome the inefficiencies in conventional virtual disk image conversion techniques, techniques for conversion of a virtual disk image are described. Generally, the described techniques provide for decreased system resource utilization for converting a virtual disk image of a virtual machine. For instance, the described techniques enable a virtual disk image to be converted from a first version to a second version, such as to enable a virtual machine to be used by different host systems. According to aspects, a "version" of a virtual disk image refers to a file format and/or a file format version of the virtual disk image. For example, converting a virtual disk image between different file formats can include conversion between formats such as Quick Emulator Copy On Write (Qcow2), Virtual Machine Disk (VMDK), Virtual Hard Disk (VHD), and so forth. Alternatively or additionally, converting a virtual disk image can include converting a file format version of the virtual disk image. For instance, a virtual disk image in the Qcow2 format can be converted by changing an image parameter of the virtual disk image, such as to enable the virtual disk image to support Qcow2 extended L2.

Accordingly, the described techniques can convert a virtual disk image by creating, inside the same file, a new header and new metadata for the virtual disk image in a new format. The new header includes pointers to the new metadata and the new metadata includes pointers to data of the virtual disk image. A previous header for the virtual disk image is removed to cause virtual disk image to be converted to a new version. In implementations, the data of the virtual disk image is not moved as part of the conversion process, or minimal data movement is performed. For instance, in contrast with conventional techniques, a new file is not generated to enable conversion of a virtual disk image. Thus, system resources are conserved in contrast with conventional copying techniques by reducing Input/Output overhead and data storage utilization as part of conversion of a virtual disk image.

In the following discussion, an example environment is first described that may employ the techniques described herein. Example scenarios and procedures are then described which may be performed in the example environment as well as other environments. Performance of the example procedures is not limited to the example environment and the example environment is not limited to performance of the example procedures. Finally, an example system and device are described that are representative in one or more exemplary aspects of one or more computing systems and/or devices that may work with the various techniques described herein.

Example Environment

Figure 1:
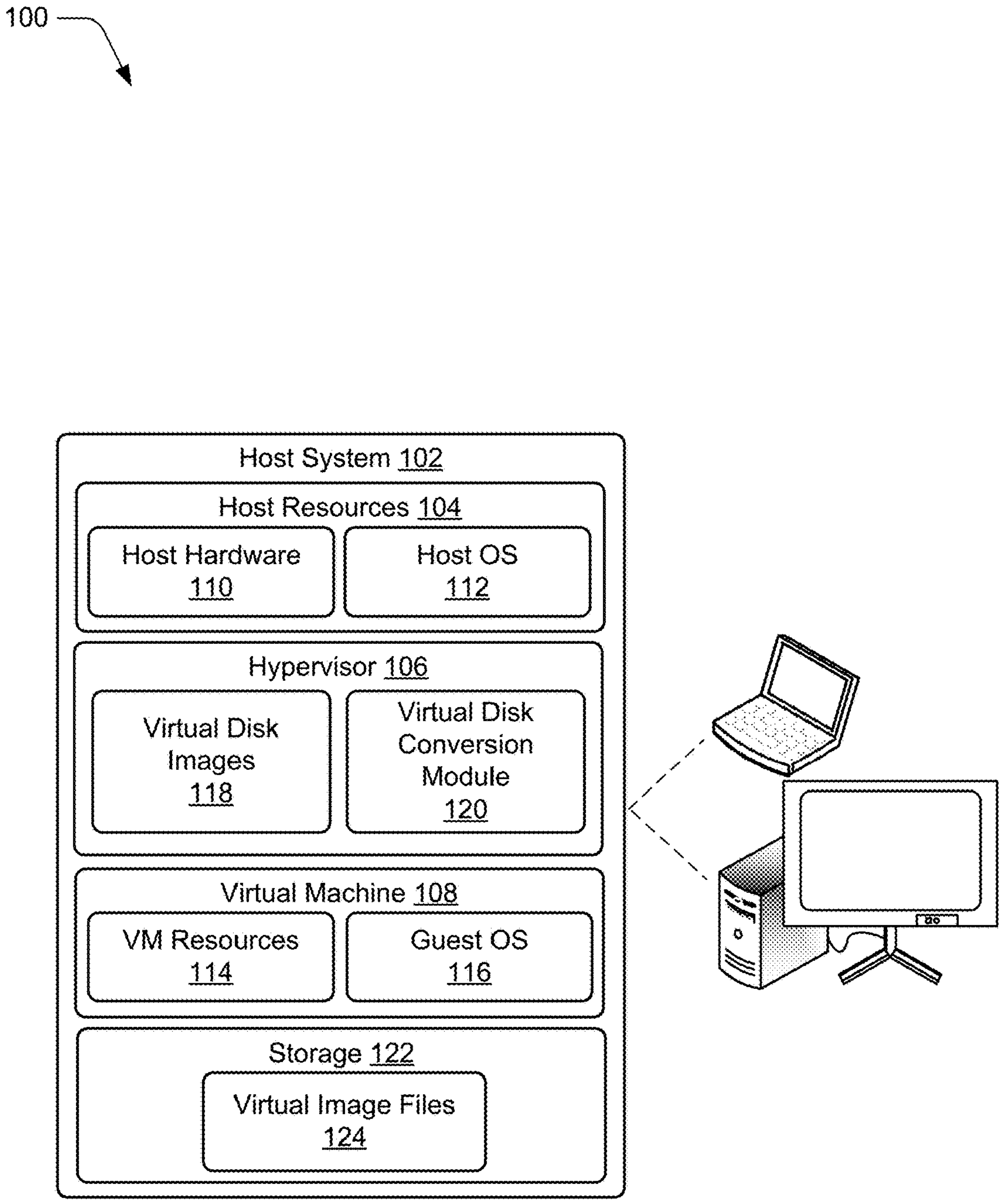
FIG. 1 is an illustration of an environment in an exemplary aspect that is operable to employ techniques described herein.

FIG. 1 is an illustration of an environment 100 in an exemplary aspect that is operable to employ conversion of a virtual disk image as described herein. The illustrated environment 100 includes a host system 102. Computing devices that are usable to implement the host system 102 may be configured in a variety of ways, such as a server, a desktop computer, a laptop computer, a mobile device, a server device, and so forth. Further, in some aspects, a computing device may be representative of a plurality of different devices such as distributed systems, clusters of computing devices, or multiple servers utilized to perform operations "over the cloud", etc.

The host system 102 includes various components and functionality to enable techniques for conversion of a virtual disk image described herein, including host resources 104, virtual image files 124 and virtual conversion module. Additional components and functionality, which may or may not be present in the system may include a hypervisor 106, and at least one instance of a virtual machine 108. The host resources 104 generally represent different computing-related resources of the host system 102, including host hardware 110 and a host operating system (OS) 112. The host hardware 110 represents different instances of physical hardware that are available at the host system 102, such as a data processing system, CPU, memory, data storage, Input/Output devices, network card, and so forth. The host OS 112 represents functionality for managing various operations of the host system 102. The host resources 104 may include other types and instances of resources, examples of which are described below with reference to the system 1000 and the computing device 1002.

The hypervisor 106 represents functionality for generating (e.g., instantiating) creating, starting, stopping, deleting, pausing, migration, disk backup, etc., and managing operation of virtual machines for the host system 102 including the virtual machine 108. For instance, as part of generating the virtual machine 108, the hypervisor 106 instantiates virtual machine (VM) resources 114 for the virtual machine 108. A guest OS 116 runs in the virtual machine 108. Different VM resources 114 may be emulated by resources created by the hypervisor 106, or may represent virtualized instances of the host resources 104, such as virtualized representations of the host hardware 110 that are usable by the virtual machine 108 to enable access to the host hardware 110, etc.

In one aspect, the host system 102 includes functionality for enabling different versions of a virtual machine disk image to be generated and/or converted (e.g., for the virtual machine 108) including virtual disk images 118 (stored as virtual image files 124) and a virtual disk conversion module 120. In one aspect, the virtual disk images 118 may represent different instances of disks of virtual machines and include a disk the virtual machine 108. The virtual disk images 118, for example, store at least part of operational data for the virtual machine 108. In at least one exemplary aspect, a random access memory (RAM) and/or disk (e.g., SSD, HDD, etc.) of the host system 102 are utilized to maintain data for the virtual machine 108, e.g., a virtual disk image 118.

The virtual disk conversion module 120 (which in one aspect, may be a part of a hypervisor, or in another aspect, may be a separate component) represents functionality for conversion of the virtual disk images 118 into different versions. A "version" of a virtual disk image 118, for instance, represents a file format in which the virtual disk image 118 is stored. Examples of different file formats for the virtual disk images 118 include, but are not limited to, Qcow2, VMD, VHD, and so forth. Alternatively or additionally, the virtual disk images 118 include different versions of a particular virtual disk image in a same file format but with different versions of the file format. For instance, a new version of a virtual disk image 118 can be generated from a previous version by the virtual disk conversion module that extends and/or updates a file format of the previous version of the virtual disk image 118.

The host system 102 further includes a storage 122 that stores virtual image files 124. The virtual image files 124, for example, represent stored instances of the virtual disk images 118. In aspects, the virtual disk conversion module 120 uses instances of the virtual disk images 118 stored as virtual image files 124, such as during and/or after conversion of a virtual disk image 118 from one version to another.

While the environment 100 is discussed with reference to particular devices, the environment may have other devices.

Having considered an example environment, consider now a discussion of some example implementation details of the techniques for conversion of a virtual disk image in accordance with one or more aspects.

Implementation Details

The following describes some different exemplary scenarios for conversion of a virtual disk image, according to some exemplary aspects. In aspects, the scenarios can be implemented via the host system 102, such as using the virtual disk conversion module 120.

Figure 2:
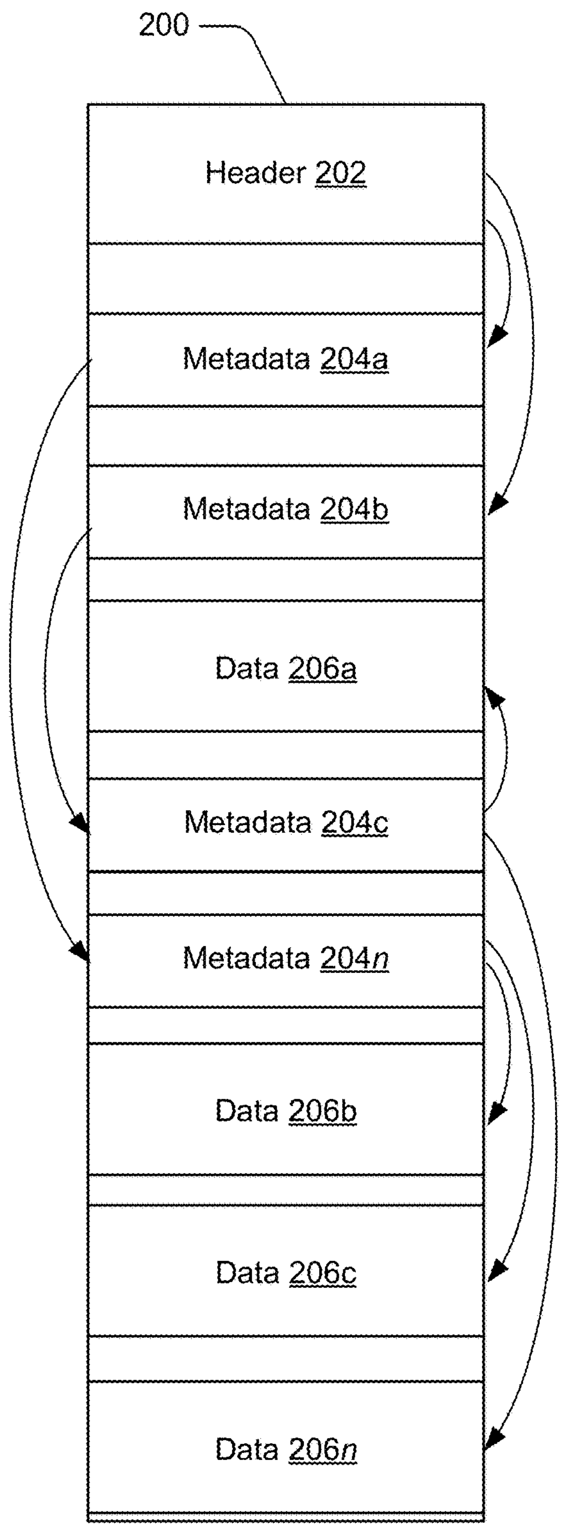
FIG. 2 depicts a virtual disk image.

FIG. 2 depicts a virtual disk image 200, such as an instance of a virtual disk image 118. The virtual disk image 118 includes a header 202, metadata 204*a*, 204*b*, 204*c*, and 204*n*, and data 206*a*, 206*b*, 206*c*, and 206*n*. In an aspect, the virtual disk image may be in format such as a loop block device (e.g., ploop and/or any other image format), Qcow2, etc. The disk image 200 illustrates pointers between different portions of the disk image 200, including the header 202, the metadata 204, and the data 206.

In some aspects, the header 202 has a fixed placement, e.g., a start of the file at offset 0, or, for example, any other predefined offset. In aspects where there is additional metadata 204 with fixed placement after the header 202, that particular metadata 204 may be considered part of header 202. For instance, there is no metadata 204 with fixed placement except the header 202.

In implementations the metadata 204 are metadata tables, which may not have a fixed position according to a particular file format. Further, the data 206 may not have a fixed position according to a particular file format. In some aspects metadata tables may be multi-level: for instance, metadata 204 may refer to a different metadata 204, and then to data 206, or may only refer to different metadata 204 and not refer to data 206.

Figure 3:
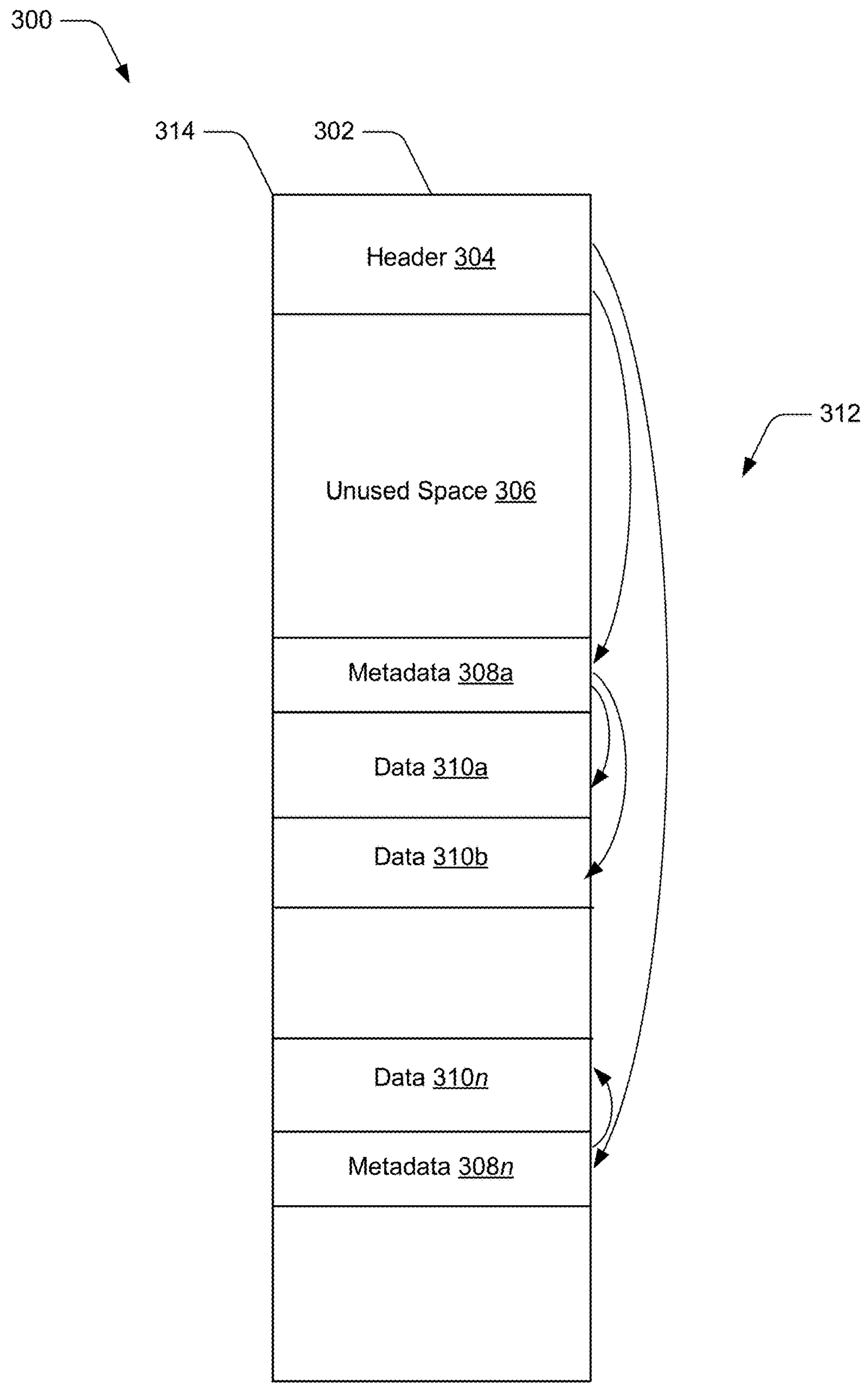
FIG. 3 depicts an example scenario illustrating aspects of conversion of a virtual disk image in accordance with aspects described herein.
Figure 4:
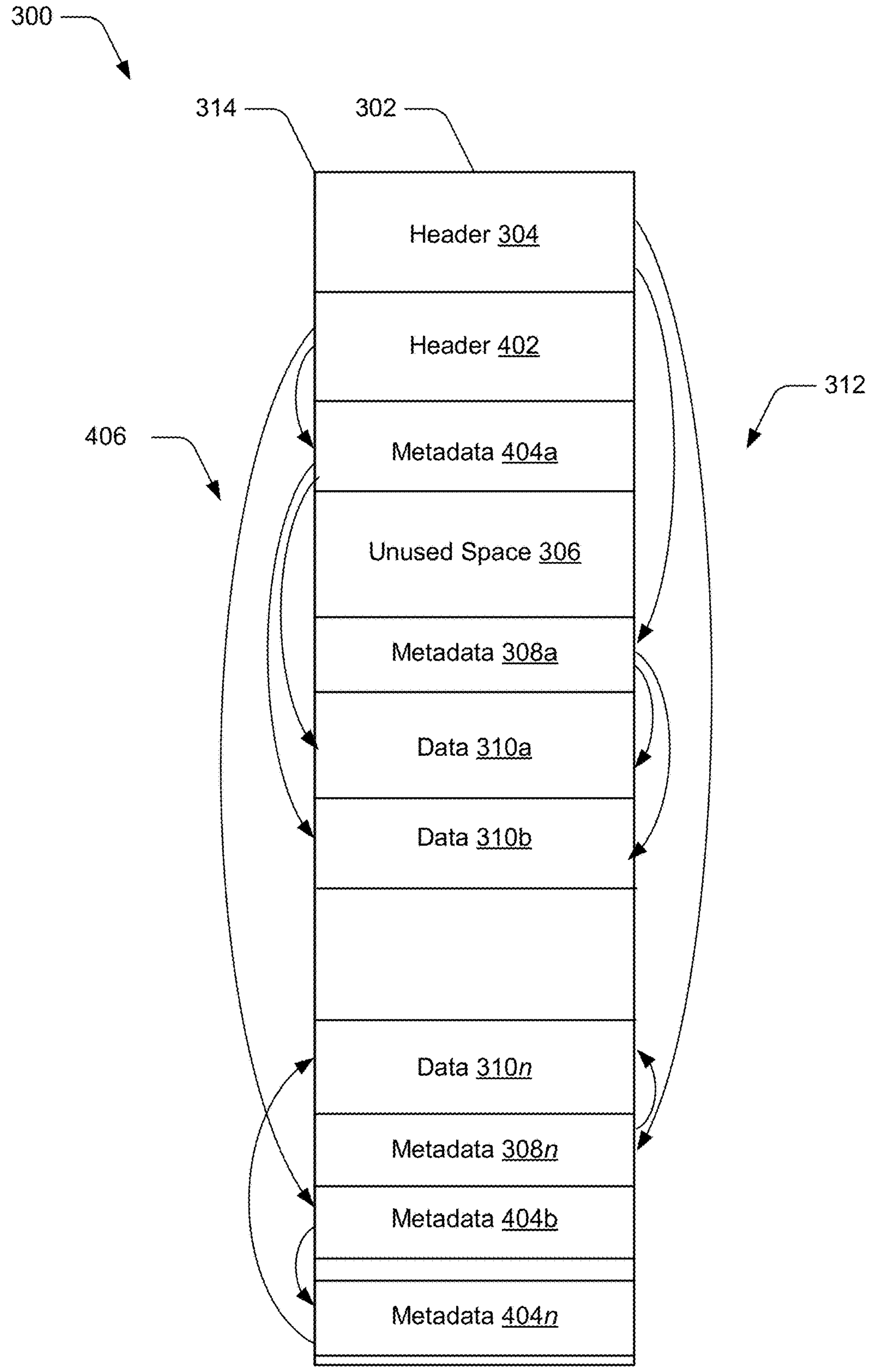
FIG. 4 depicts an example scenario illustrating aspects of conversion of a virtual disk image in accordance with aspects described herein.
Figure 5:
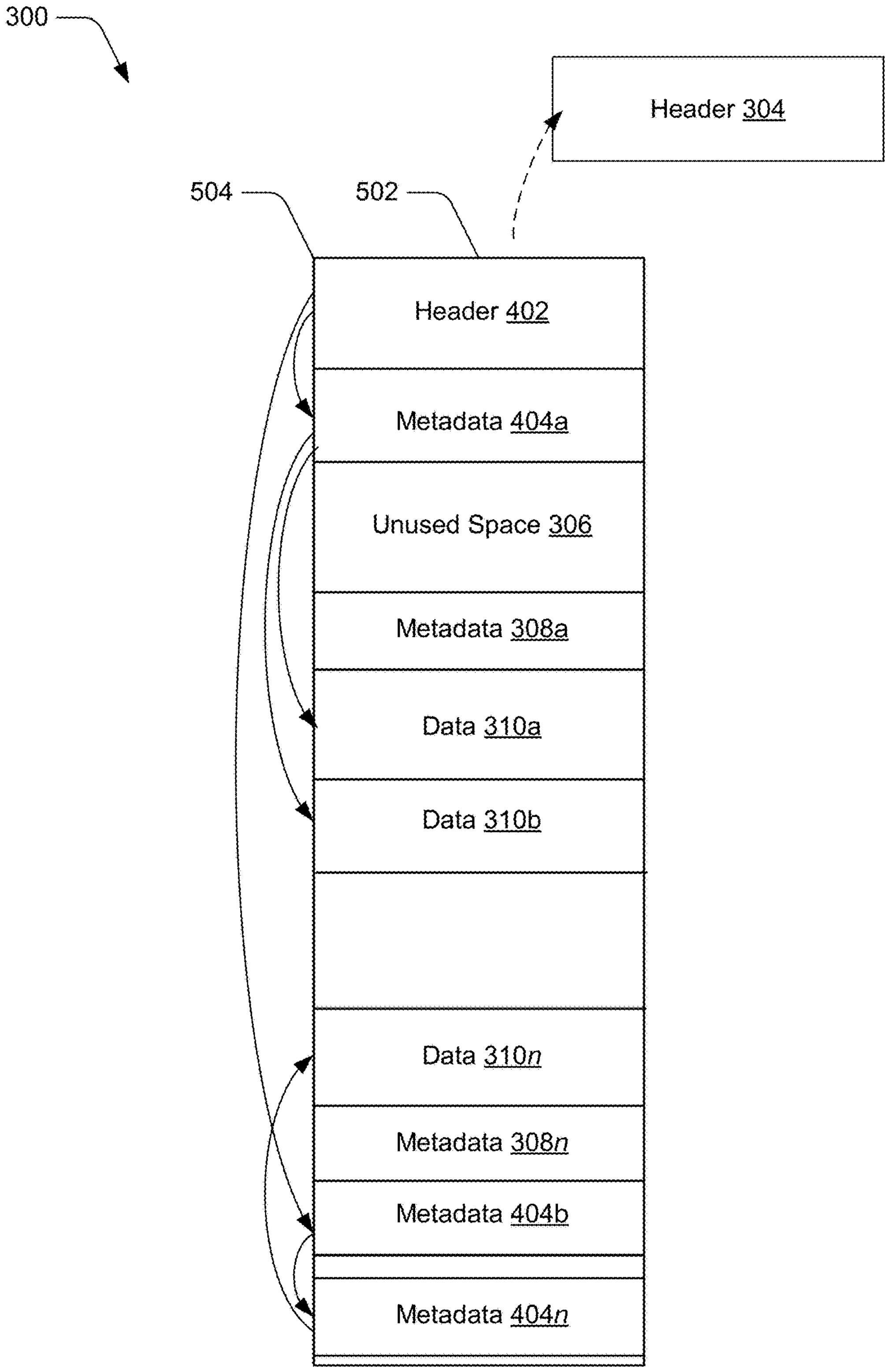
FIG. 5 depicts an example scenario illustrating aspects of conversion of a virtual disk image in accordance with aspects described herein.

FIGS. 3-5 depict an example scenario 300 illustrating aspects of conversion of a virtual disk image according to aspects. The scenario 300, for example, depicts an example aspect for converting a virtual image file to a different version, such as a different file format.

FIG. 3 illustrates that the scenario 300 includes a virtual disk image 302 including a header 304, unused space 306, metadata 308*a*, 308*n*, and data 310*a*, 310*b*, and 310*n*. Further, different pointers 312 between different portions of the virtual disk image 302 are illustrated. For example, the header 304 includes pointers 312 to the metadata 308*a*, 308*n*, the metadata 308*a* includes pointers 312 to the data 310*a*, 310*b*, and the metadata 308*n* includes a pointer 312 to the data 310*n*. Further, the virtual disk image 302 includes a start position 314 based on the header 304. The start position 314, for instance, represents a zero offset value for the virtual disk image 302.

FIG. 4 illustrates that in the scenario 300, to enable a new version of the virtual disk image 302 to be generated, a new header 402 is generated and placed within the unused space

306. The new header 402, for example, corresponds to a new file format different than a file format of the header 304. In aspects, if there is not enough room in the unused space 306 to place the new header 402 after the header 304, a method can be implemented to create additional available space after the header 304 for the header 402. An example process for creating additional space for a new header is described below with reference to the scenarios 600.

As further illustrated, new metadata 404*a*, 404*b*, 404*n* is generated in the new format and placed in available space within the virtual disk image 302. For instance, since there is still remaining space in the unused space 306, the metadata 404*a* is placed after the header 402 within the unused space 306, e.g. adjacent the header 304. New pointers 406 are then generated for the header 402 to identify locations of the metadata 404*a*, 404*b*. Further, new pointers 406 are generated for the metadata 404*a* to identify locations of the data 310*a*, 310*b*, and for the metadata 404*b* to identify a location of the metadata 404*n*, and for the metadata 404*n* to identify a location of the data 310*n*.

According to some aspects, offset values for the new pointers 406 are generated based on a start of the new header 402, e.g., not based on a current start of the old header 304 (e.g., not based on a start of the virtual disk image 302 at the start position 314). The changes made to the virtual disk image 302 can then be saved to disk, e.g., by synchronizing cached writes to a persistent storage (e.g., by performing a sync operation in case of OS Linux).

According to aspects, during the changes performed in accordance with FIG. 4 and right after that, the virtual disk image 302 remains in an original format based on the original header 304. For instance, if a system failure occurs (e.g., a power failure of the host system 102), the virtual disk image 302 would still be valid (e.g., in a consistent state) in its original format, as it still has original header 304, original metadata 308*a*, 308*n*, and original data 310*a*, 310*b*, 310*n* still may be accessed based on the header 304. The start position 314, for example, remains a valid (e.g., zero) offset value for the virtual disk image 302.

FIG. 5 illustrates that further to the scenario 300, a virtual disk image 502 is generated by removing the previous header 304 and designating the header 402 as an active header of the virtual disk image 502. The virtual disk image 502, for instance, represents a new version of the virtual disk image 302 in a new format and/or new version (e.g., corresponding to the header 402). In aspects, the header 304 is atomically cut from the virtual disk image 302 to generate the virtual disk image 502. In one aspect, atomically cutting the old header involves also changing the start of the file position and/or new header position correspondingly in the same atomic operation. For instance, the header 402 may be designated as a start position 504 of the virtual disk image 502, e.g., a zero offset (or any other predefined offset) value of the virtual disk image 502.

Note that in aspects, even if a system failure (e.g., power failure) occurs, atomic cutting of the header will guarantee that the file will still be consistent, i.e., a valid virtual disk image will still exist either in the form of the original virtual disk image 302 or the new virtual disk image 502.

According to some aspects, atomically cutting of the old header may be done by means of a file system and/or an OS kernel. In some aspects, the file being converted shall be previously placed on a file system (e.g., ext4, XFS, or any other with corresponding feature, such as a lot of modern file systems, etc.), which allows for atomic cuts from a file.

In one aspect, for instance, a special system call may be called to atomically cut the header 304. One example, of such system call, related to OS Linux, may be fallocate. Any other similar system calls may be used for any other operating systems. For instance, specifying the FALLOC_FL_COLLAPSE_RANGE flag as a mode in the fallocate system call (e.g., defined as "int fallocate(int fd, int mode, off_t offset, off_tlen);") will allow for removing a byte range (e.g., occupied by the old header 304) from the file, without leaving a hole. In such case, the byte range to be collapsed starts at offset and continues for len bytes. At the completion of the operation, the contents of the file starting at the location offset+len will be appended at the location offset, and the file will be len bytes smaller. Notice, that any other means allowing for atomically cutting a part of a file may also be used.

In one aspect, a file system may place limitations on the granularity of the operation, in order to ensure efficiency. In such case, size of the cut part of the file will be aligned to the file system granularity, e.g., the header 304 with an additional padding will be cut. In such case, creation room (e.g., preparing an unused space) for the new header shall also consider granularity. In case of fallocate example, typically, offset and *lenis* to be a multiple of the file system logical block size, which varies according to the file system type and configuration. If a file system has such a requirement, fallocate( ) fails with the error EINVAL if this requirement is violated. If the region specified by offset plus len reaches or passes the end of file, an error is returned; instead, ftruncate(2) may be used to truncate a file. Notice, that any other means allowing for atomically cutting a part of a file may also be used.

Notice that in the scenario 300 the data 310 is not copied or moved as part of converting the virtual disk image 302 to the virtual disk image 502. In additional or alternative aspects, conversion of a virtual disk image may include movement of at least some data 310, such as to create room for the new header 402 as described below.

Figure 6:
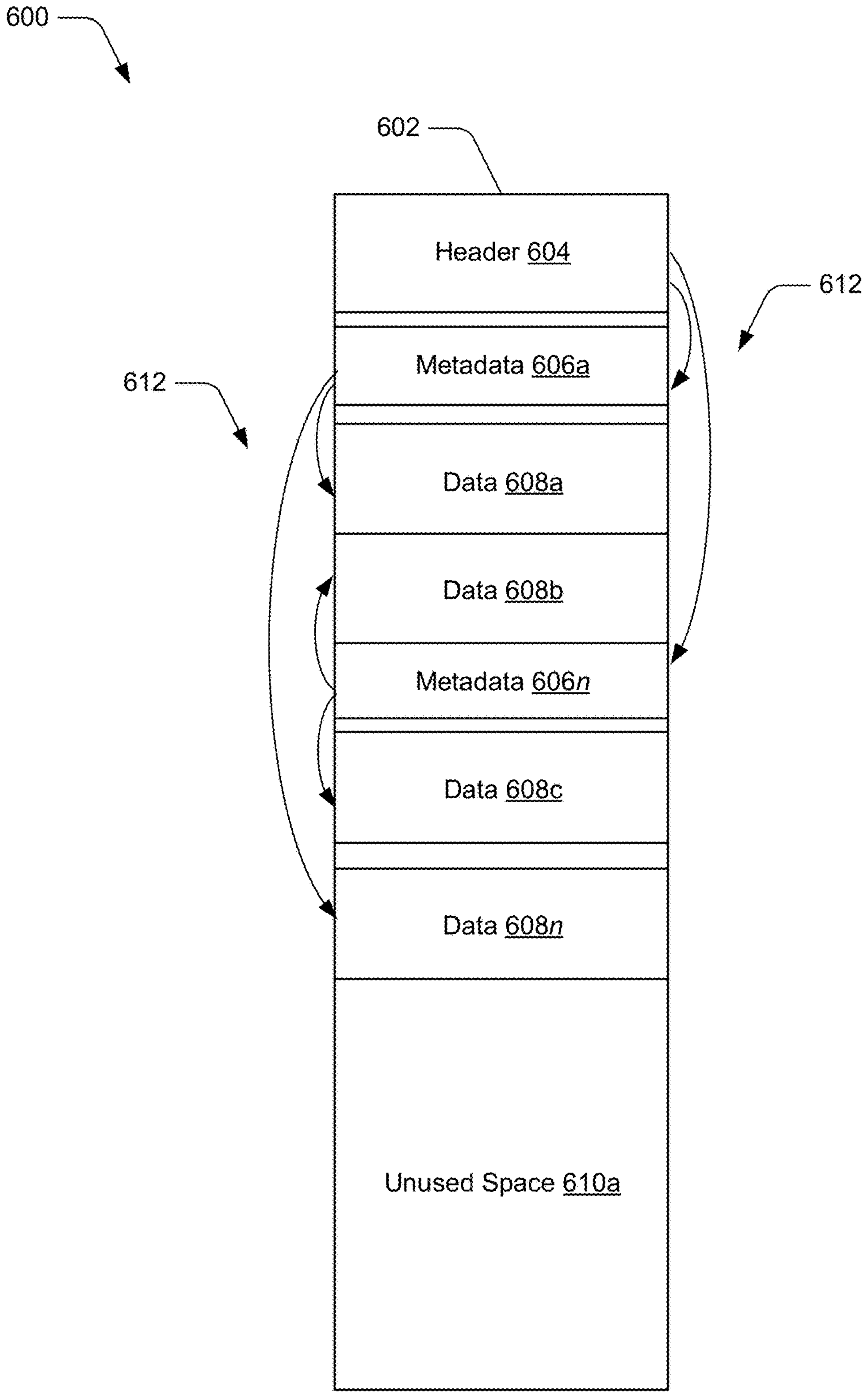
FIG. 6 depicts an example scenario illustrating aspects of conversion of a virtual disk image in accordance with aspects described herein.
Figure 7:
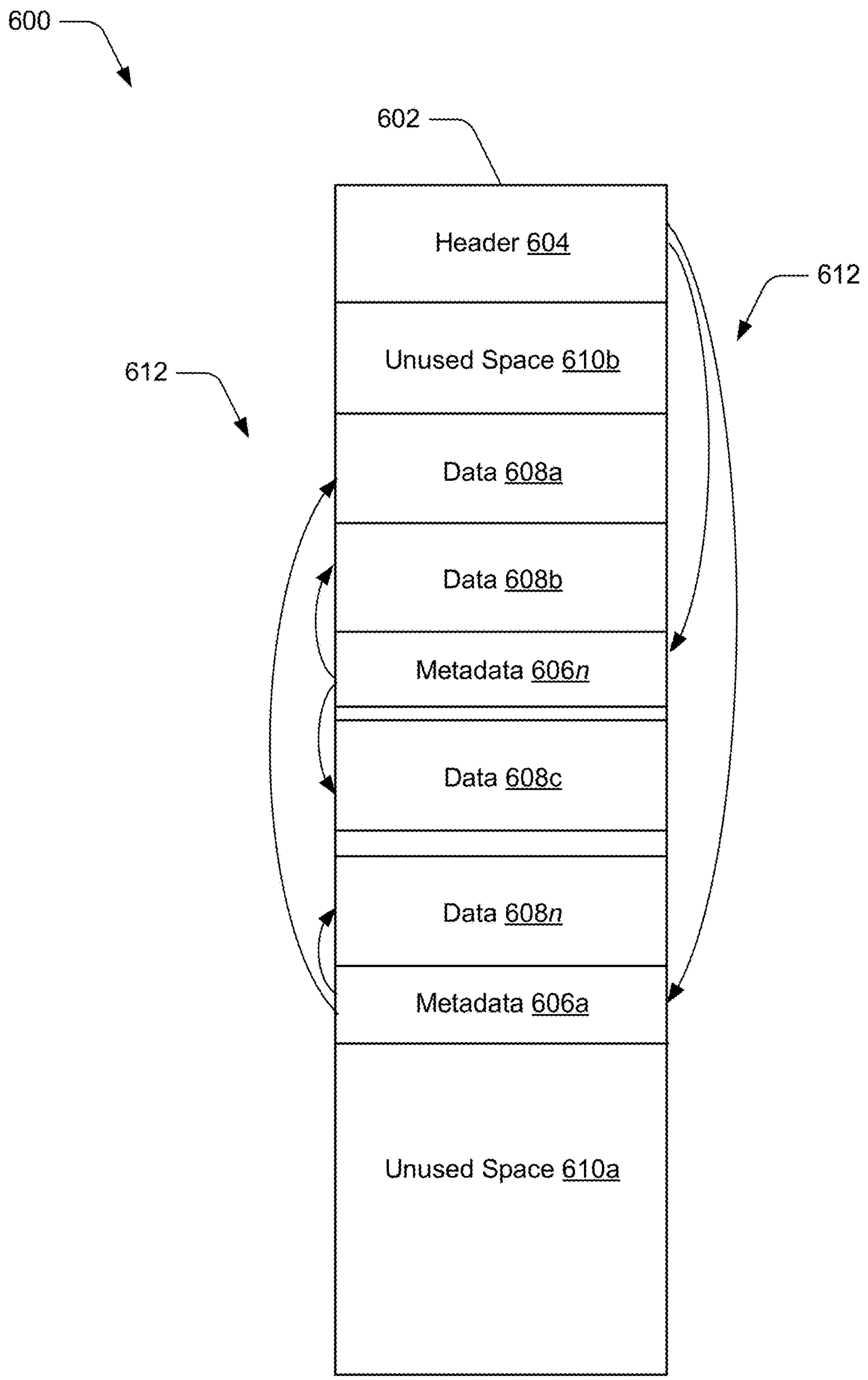
FIG. 7 depicts an example scenario illustrating aspects of conversion of a virtual disk image in accordance with aspects described herein.
Figure 8:
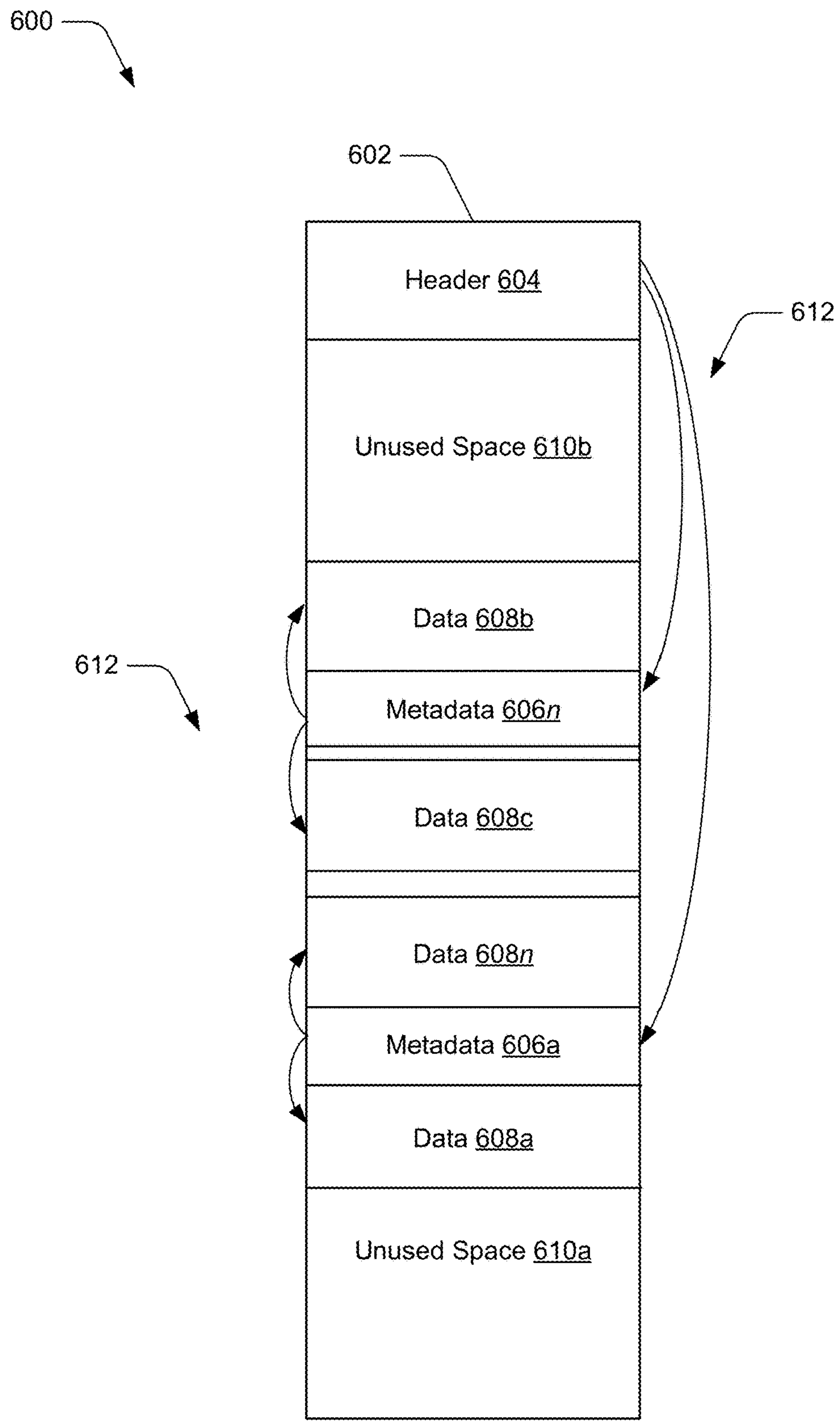
FIG. 8 depicts an example scenario illustrating aspects of conversion of a virtual disk image in accordance with aspects described herein.

FIGS. 6-8 depict an example scenario 600 illustrating aspects of conversion of a virtual disk image according to aspects. The scenario 600, for example, depicts an example aspect for freeing occupied space in a virtual disk image 602 to enable the virtual disk image 602 to be converted to a different version, such as described above with reference to the scenario 300.

FIG. 6 depicts that in the scenario 600 the virtual disk image 602 includes a header 604, metadata 606*a*, 606*n*, data 608*a*, 608*b*, 608*c*, and 608*n*, and unused space 610*a*. Further, the virtual disk image 602 includes pointers 612 from the header 604 to the metadata 606 and from the metadata 606 to the data 608. Accordingly, to enable a new header to be placed after the header 604 as part of converting the virtual disk image 602 to a new version, space is to be created after the header 604.

FIG. 7 depicts that further to the scenario 600 for creating room after the header 604, the metadata 606*a* is moved to the unused space 610*a* to generate an unused space 610*b* after (e.g., adjacent) the header 604. In aspects, a synchronizing cached writes to a persistent storage (e.g., sync) operation is then performed. E.g., a sync is called to write changes made to the virtual disk image 602 to disk. Further, a pointers 612 from the header 604 is modified to identify the new location of the metadata 606*a*. Notice that pointers 612 of the metadata 606*a* still identify the correct locations of the data 608*a*, 608*n*. In this scenario, synchronizing cached writes to a persistent storage will guarantee consistency of the virtual disk image even in case of a failure (e.g., power off). Even after system failure, the data will still be available using pointers.

FIG. 8 depicts that further to the scenario 600, additional room can be created after the header 604 to enable insertion of a new header. Accordingly, the data 608*a* is moved to the unused space 610*a*, e.g., to a position after the metadata 606*a*. In aspects, a synchronizing cached writes to a persistent storage is then performed. E.g., a sync is called to write changes made to the virtual disk image 602 to disk. The "move" increases a size of the unused space 610*b*. Further, a pointer 612 of the metadata 606*a* is modified to identify the new location of the data 608*a*. Accordingly, the virtual disk image 602 can be converted to a new version by inserting a new header in the unused space 610*b*, such as described above with reference to the scenario 300.

In a variation on the scenario 600, if there is unused space in a middle portion of a virtual disk image 602, the metadata 606*a* and optionally the data 608*a* can be moved to the unused space in the middle portion instead of the unused space 610*a* at an end portion of the virtual disk image 602. Further, multiple metadata 606 and data 608 move operations may be performed until there is sufficient space after the header 604 for a new header. In one aspect, file system operation granularity is taken into account when determining how much room is needed and where to place the metadata and/or data being moved. Notice, that during "moving" of metadata and/or data, a copy of the metadata and/or the data is created in the new place(s), and the old version of the metadata and/or the data may still persist in the file on its original place (and then be overwritten, at least partially, e.g., by the new header), but after the move is complete, as there are no more pointers pointing to the original place of the metadata and/or the data, their original place will be considered as unused space.

According to aspects, if a system failure occurs during a portion of the scenario 600 (e.g., during any particular operation), the virtual disk image 602 would still be valid (e.g., in a consistent state) since the virtual disk image 602 would include a previous valid pointer 612 to metadata and/or data, and/or would include a new valid pointer 612 to metadata and/or data.

Having discussed example details of the techniques for conversion of a virtual disk image, consider now some example procedures to illustrate additional aspects of the techniques.

Example Procedure

This section describes an example procedure for VM disk conversion (resistible to power off) in one or more aspects. Aspects of the procedure may be implemented in hardware, firmware, or software, or a combination thereof. The procedure is shown as a set of blocks that specify operations performed by one or more devices and is not necessarily limited to the order shown for performing the operations by the respective blocks. In at least some aspects the procedure is performed by a suitably configured set of devices, such as via the host system 102 and the virtual disk conversion module 120, and using aspects described in the scenarios above.

Figure 9:
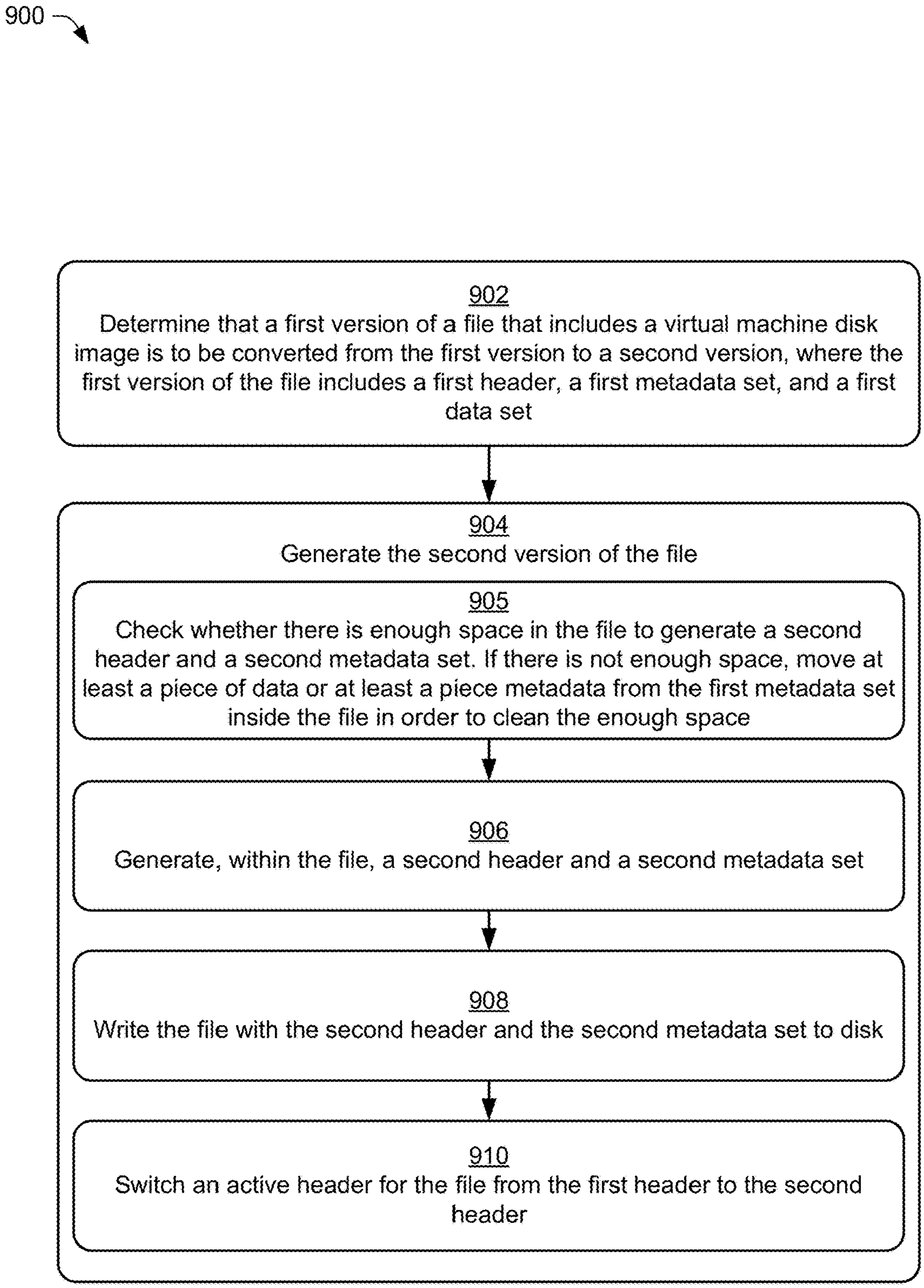
FIG. 9 depicts an example procedure for conversion of a virtual disk image in accordance with aspects described herein.

FIG. 9 depicts an example procedure 900 for conversion of a virtual disk image. The procedure 900, for example, represents an example method for performing various aspects of the scenarios described above and the claims below.

Step 902 determines that a first version of a file that includes a virtual machine disk image is to be converted from the first version to a second version, where the first version of the file includes a first header, a first metadata set, and a first data set. The virtual disk conversion module 120, for example, determines that the virtual machine disk image is to be converted to a different format, such as for use by a different host system.

Step 904 generates the second version of the file (e.g., convert the file from one version/format to another). For instance, generating the second version of the file includes: Step 905, which may be optional, checks whether there is enough space in the file to generate a second header and a second metadata set. If there is not enough space, the step 905 moves at least a piece of data or at least a piece of metadata from the first metadata set inside the file in order to clean the enough space. Step 906 generates, within the file, the second header and the second metadata set. Step 908 writes the file with the second header and the second metadata set to disk (or synchronizes cached writes to a persistent storage in any other way). Step 910 switches an active header for the file from the first header to the second header.

In one aspect, the second header and second metadata set from the point of view of the first format are essentially unused space and do not violate first format data.

In one aspect, the method may be used for all mentioned formats, and also for any other format, which comprises a piece-wise linear translation of the guest linear addresses to host file offsets.

In one aspect, the method comprises power-off resistance.

In one aspect, the state of the file that is stored on the persistent storage is valid and consistent at any time during performing the steps of the method, either from the point of view of the first format, or from the point of view of the second format.

Accordingly, the described techniques can be employed to convert virtual machine disk images between different versions. Having described an example procedure in accordance with one or more aspects, consider now an example system and device that can be utilized to implement the various techniques described herein.

Example System and Device

Figure 10:
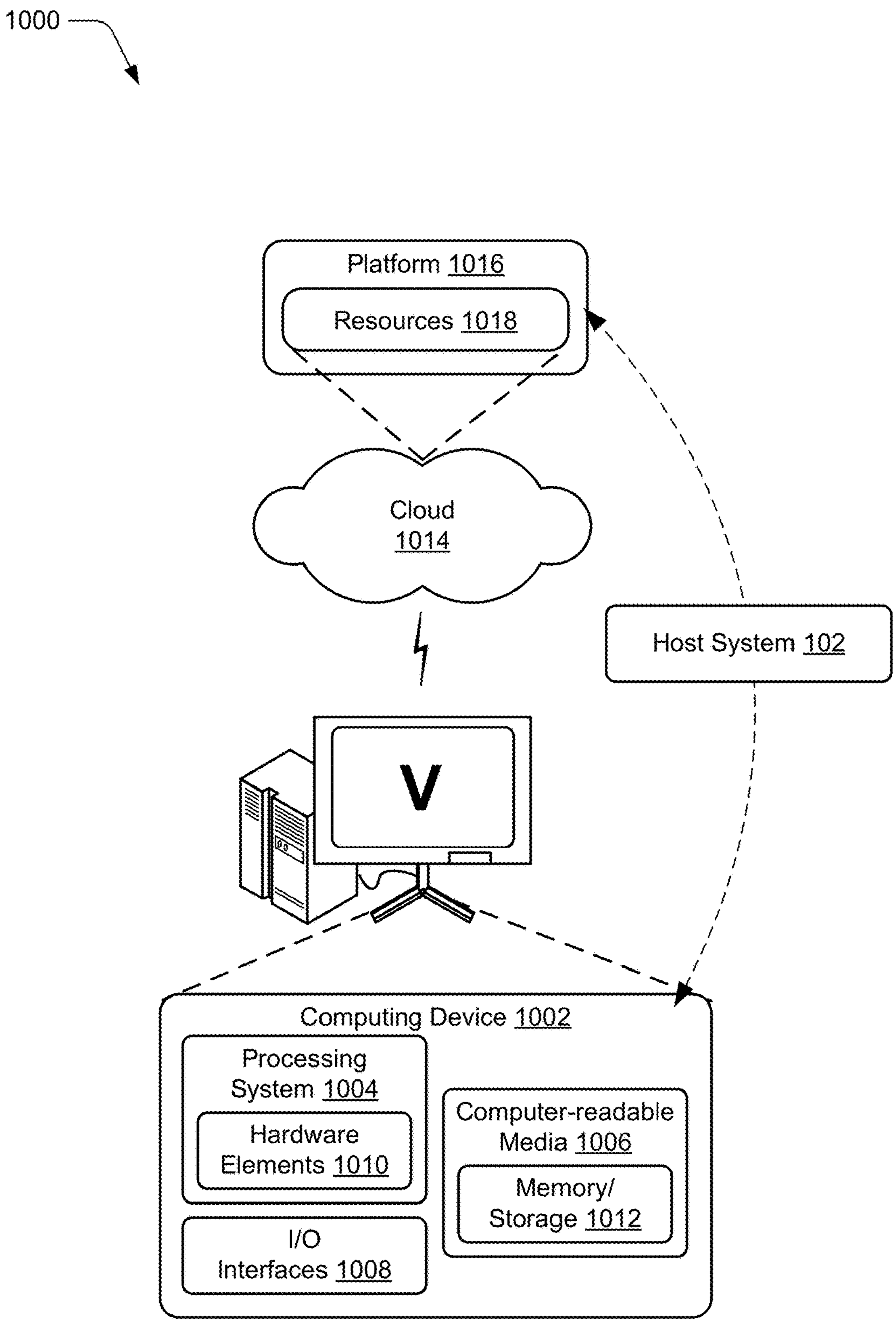
FIG. 10 illustrates an example system including various components of an example device that can be implemented as any type of computing device as described and/or utilized with reference to FIGS. 1-9 to implement aspects of the techniques described herein.

FIG. 10 illustrates an example system generally at 1000 that includes an example computing device 1002 that is representative of one or more computing systems and/or devices that may implement the various techniques described herein. This is illustrated through inclusion of the host system 102. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/Output interface(s) 1008 are representative of functionality to allow a user to enter commands and information to computing device 1002, and also allow information to be presented to the user and/or other components or devices using various Input/Output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "node," "engine," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004.

The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

Additional aspects of the techniques, features, and/or methods discussed herein relate to one or more of the following:

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

determining that a first version of a file that includes a virtual machine disk image is to be converted from the first version to a second version, wherein the first version of the file includes a first header, a first metadata set, and a first data set; and generating the second version of the file, including:

generating, within the file and without copying the first data, a second header and a second metadata set, wherein the second metadata set points to reference locations of the first metadata set without copying the first metadata set;

synchronizing changes made to the file to a persistent storage; and switching an active header for the file from the first header to the second header, wherein the switching employs an atomic cut technique configured to allow the first version or the second version of the file to remain valid in the event of a system failure or power off event, before and after the atomic cut technique is employed.

2. The method of claim 1, wherein the second version of the file comprises one of a different file format than the first version of the file, or a modification of a format attribute of a file format of the first version.

3. The method of claim 1, wherein generating the second header within the file comprises generating the second header within a first unused space within the file.

4. The method of claim 3, further comprising generating the first unused space within the file by moving a first metadata of the first metadata set to a second unused space within the file.

5. The method of claim 4, wherein the first unused space is adjacent the first header.

6. The method of claim 4, wherein generating the first unused space with the file further comprises moving a data portion of the first data set to a third unused space within the file.

7. The method of claim 6, further comprising configuring a pointer in the first metadata to identify a location of the moved data portion of the first data set.

8. The method of claim 1, wherein generating the second version of the file comprises maintaining one or more of the first version of the file or the second version of the file in a consistent state during generation of the second version of the file.

9. The method of claim 1, further comprising configuring one or more pointers of the second metadata set to identify a location of the first data set within the file, and wherein the one or more pointers identify the location of the first data set relative to a start of the second header.

10. The method of claim 9, further comprising cutting the first header to cause the second header to be a new start of the file.

11. The method of claim 1, wherein the method comprises power-off resistance.

12. A format conversion system comprising:

one or more processors; and one or more storage devices comprising processor executable instructions that, responsive to execution by the one or more processors, cause the system to perform operations comprising:

determining that a first version of a file that includes a virtual machine disk image is to be converted from the first version to a second version, wherein the first version of the file includes a first header, a first metadata set, and a first data set; and generating the second version of the file, including:

generating, within the file, a second header and a second metadata set, wherein the second metadata set points to reference locations of the first metadata set without copying the first metadata set;

synchronizing changes made to the file to a persistent storage; and switching an active header for the file from the first header to the second header, wherein the switching employs an atomic cut technique configured to allow the first version or the second version of the file to remain valid in the event of a system failure or power off event.

13. The format conversion system of claim 12, wherein the operations further comprise:

generating a first unused space within the file by moving a first metadata of the first metadata set to a second unused space within the file; and generating the second header within the file within the first unused space within the file.

14. The format conversion system of claim 13, wherein generating the first unused space within the file further comprises moving a data portion of the first data set to a third unused space within the file.

15. The format conversion system of claim 12, wherein generating the second version of the file comprises maintaining one or more of the first version of the file or the second version of the file in a consistent state during generation of the second version of the file.

16. The format conversion system of claim 12, further comprising configuring one or more pointers of the second metadata set to identify a location of the first data set within the file, and wherein the one or more pointers identify the location of the first data set relative to a start of the second header.

17. The format conversion system of claim 16, further comprising cutting the first header to cause the second header to be a new start of the file.

18. The format conversion system of claim 12, wherein generating the second version of the file comprises maintaining a position of the first data set within the file from the first version of the file such that the first data set has a same position within the second version of the file.

19. A virtual machine environment comprising one or more processors; and one or more storage devices comprising processor executable instructions that, responsive to execution by the one or more processors, cause the system to perform operations comprising:

wherein the virtual machine environment that implements a disk conversion system comprising:

a virtual disk conversion module configured to:

determine that a first version of a file that includes a virtual machine disk image is to be converted from the first version to a second version, wherein the first version of the file includes a first header, a first metadata set, and a first data set; and generate the second version of the file, including to:

generate, within the file, a second header and a second metadata set, wherein the second metadata set points to reference locations of the first metadata set without copying the first metadata set;

synchronize changes made to the file to a persistent storage; and switch an active header for the file from the first header to the second header, wherein the switch employs an atomic cut technique configured to allow the first version or the second version of the file to remain valid in the event of a system failure or power off event.

20. The disk conversion system of claim 19, wherein the virtual disk conversion module is further configured to:

generate a first unused space within the file by moving a first metadata of the first metadata set to a second unused space within the file; and generate the second header within the file within the first unused space within the file.

21. The disk conversion system of claim 19, wherein the virtual disk conversion module is further configured to maintain one or more of the first version of the file or the second version of the file in a consistent state during generation of the second version of the file.

* * * * *